United States Patent
Zaltron (10) Patent No.: US 6,322,345 B1
(45) Date of Patent: Nov. 27, 2001

(54) APPARATUS FOR FORMING EDIBLE BAKERY PASTE

(75) Inventor: Giampietro Zaltron, Vicenza (IT)

(73) Assignee: Doge Food Processing Machinery S.r.l. (IT)

( * ) Notice: Subject to any disclaimer, the term of this patent is extended or adjusted under 35 U.S.C. 154(b) by 0 days.

(21) Appl. No.: 09/081,818

(22) Filed: May 20, 1998

Related U.S. Application Data (63) Continuation-in-part of application No. 08/662,100, filed on Jun. 14, 1996, now abandoned, which is a continuation-in-part of application No. 08/266,838, filed on Jun. 28, 1994, now abandoned.

(30) Foreign Application Priority Data

Jul. 14, 1993 (IT) .............................................. MI93A1555

(51) Int. Cl.⁷ ............................... A21C 3/02; B29C 55/18
(52) U.S. Cl. ......................... 425/363; 425/367; 425/449; 426/502; 426/517
(58) Field of Search ................................... 426/502, 517; 425/363, 367, 447, 449

(56) References Cited

U.S. PATENT DOCUMENTS

| | | | |
|---|---|---|---|
| 1,975,326 | 10/1934 | Loose et al. | 426/502 |
| 3,033,132 | 5/1962 | Duncan et al. | 426/502 |
| 3,851,088 * | 11/1974 | Albrecht et al. | 426/502 |
| 3,917,856 | 11/1975 | Wong et al. | 426/502 |
| 4,057,377 | 11/1977 | Sakurazawa | 425/367 |
| 4,113,819 | 9/1978 | Hayashi et al. | 425/363 |
| 4,375,349 * | 3/1983 | Vrbanek | 425/367 |
| 4,583,930 | 4/1986 | Hayashi | 426/502 |
| 4,770,619 | 9/1988 | Rijkaart | 425/367 |
| 4,828,863 | 5/1989 | Aoki | 426/512 |
| 4,904,491 | 2/1990 | Morikawa et al. | 426/502 |
| 5,079,014 | 1/1992 | Morikawa et al. | 426/502 |
| 5,091,202 | 2/1992 | Hayashi | 426/502 |
| 5,106,636 | 4/1992 | Ban et al. | 426/502 |
| 5,110,277 * | 5/1992 | Hayashi | 425/363 |
| 5,182,124 | 1/1993 | Kageyama et al. | 426/502 |
| 5,225,209 | 7/1993 | Hayashi | 425/363 |
| 5,266,341 | 11/1993 | Morikawa et al. | 426/502 |
| 5,310,569 | 5/1994 | Muller | 426/502 |
| 5,888,573 * | 3/1999 | Hayashi | 426/502 |

FOREIGN PATENT DOCUMENTS

| | | |
|---|---|---|
| 598922 | 5/1934 | (DE) . |
| 4212765 | 10/1992 | (DE) . |
| 0273760 | 7/1988 | (EP) . |
| 2400844 | 3/1979 | (FR) . |
| 2559029 | 9/1985 | (FR) . |
| 254172 | 7/1926 | (GB) . |
| 1115859 | 5/1968 | (GB) . |

* cited by examiner

Primary Examiner—Robert Davis
Assistant Examiner—Joseph Leyson (57) ABSTRACT

An apparatus for extruding edible paste which includes a supporting framework; a hopper for feeding paste to be extruded; at least one pair of sizing or lamination cylinders arranged in sequence downstream of the hopper; a belt conveyor which is suitable for receiving and removing the extruded and laminated paste that leaves the lamination cylinders; motor assembly for the lamination cylinders; one or more pairs of extraction and dosage elements which are arranged directly below the hopper and are suitable for extracting, in a uniform and pulsed manner, paste from the hopper to feed it to the lamination cylinders. The extraction and dosage elements are arranged in a spaced relationship from both the outlet of the hopper and the lamination cylinders, so that the paste is exposed to the external environment at the gaps formed between the extraction and dosage elements and both the outlet of the hopper and the lamination cylinders, thereby to eliminate the formation of any excess compression of the paste at the gaps.

18 Claims, 7 Drawing Sheets

APPARATUS FOR FORMING EDIBLE BAKERY PASTE

CROSS-REFERENCE TO RELATED APPLICATIONS

This application is a continuation-in-part of U.S. application Ser. No. 08/662,100, filed on Jun. 14, 1996, now abandoned, which in turn is a continuation-in-part of U.S. application Ser. No. 08/266,838, filed on Jun. 28, 1994, now abandoned.

BACKGROUND OF THE INVENTION

The present invention relates to an apparatus for extruding bakery paste, such as bread dough, leavened dough, dough for pizzas, croissants and the like, flaky pastry such as biscuits and the like, and non-bakery pastes such as pasta for lasagna, ravioli, both with and without eggs.

Extrusion apparatuses are generally meant to produce a rather thin sheet without however stretching it or compressing it excessively, in other words without subjecting it to an "ill-treatment" which generally leads to one or more of the following problems: breakage of the fibers of the mix, and thus reduction in the elasticity of the paste, damage to the gluten, and alteration in the organoleptic qualities; this entails that it is impossible to obtain a finished product that resembles as closely as possible the result of a manual process in which the duration of the fragrance of the product in the course of time is enhanced.

So far, extruders have already been proposed that are formed by a hopper with a series of pairs of cylindrical lamination rollers arranged below the hopper. In this solution, the lamination rollers compress and stress the pasty mass in forming the continuous sheet of paste until they damage its fibers.

For example, from the United Kingdom Patent Specification No. 254,172 there is known a machine for rolling and folding or doubling dough which includes a hopper for containing a batch of dough mixture at the bottom of which there is provided an outlet for the dough mixture, and below which there is arranged a succession of cylindrical roller pairs through which the rough mixture of the ingredients of the dough mixture is successively rolled. The circumferential speeds of the roller pairs decrease in the direction of travel of the dough, and the gaps between the rollers of the successive pairs of rollers gradually increase in the same direction, such that the quick supply of a thin sheet of dough to a pair of rollers having a lower circumferential speed necessarily causes the dough sheet to be doubled or folded. The doubling and folding of the dough and successive feeding between the roller pairs generally compresses and stresses the pasty mass in forming the continuous sheet of paste until its fibers are damaged.

This ill-treatment of the dough mixture is further exacerbated by the provision of rotating shafts provided with short radially extending pins inside the hopper for stirring and distributing the dough in the hopper and forcing it to the hopper outlet at which the first upper pair of cylindrical rollers is directly arranged, such that the first upper pair of rollers is aided by the rotating shafts in gripping the dough.

Dough shaping apparatuses are known from United Kingdom Patent Specification No. 1,115,859 and published French Patent Application No. 2,559,029, which include rotating cylinders having radially protruding blades for pushing the dough to a shaping device disposed underneath the cylinders. The arrangement in these devices however is such as to create closed compression chambers between the cylinders and the shaping device which may lead to the excessive damaging of the dough.

There is also known from the U.S. Pat. No. 4,057,377 a vertical type noodle rolling apparatus wherein the noodle strip is progressively rolled as it is moved downwardly from a feed hopper and between a series of pairs of cylindrical rollers. The apparatus is suitable for forming noodle sheets, however the progressive compressing provided by the cylindrical roller pairs makes this type of apparatus generally unsuitable for forming sheets of paste for example in the form of leavened dough or other delicate dough wherein the progressive compression would lead to the damaging of the paste fibers and/or alteration of the qualities of the paste which are necessary such that the finished product resembles as closely as possible the result of a manual process.

SUMMARY OF THE INVENTION

A principal aim of the present invention is to provide an apparatus for forming a continuous sheet of paste in which the causes that promote fatigue or stress in the paste are eliminated or substantially reduced.

An object of the present invention is to provide an apparatus that allows considerable productivity and ensures the production of a substantially perfect and uniform sheet.

In accordance with one preferred aspect of the invention, there is provided an apparatus for extruding edible paste which comprises: a supporting framework; a hopper for feeding paste to be extruded, multiple pairs of sizing or lamination cylinders arranged in sequence downstream of the hopper and forming a convoluted path for the paste being laminated; a belt conveyor which is suitable for receiving and removing the extruded and laminated paste or sheet that leaves the lamination cylinders; drive means for said lamination cylinders; and at least one pair of contrarotating extraction and dosage elements which are arranged directly below the hopper and are suitable for extracting, in a uniform and pulsed manner, paste from the hopper to feed it to the lamination cylinders. The extraction and dosage elements are arranged in a spaced relationship from both the outlet of the hopper and the lamination cylinders, so that the paste is exposed to the external environment at the gaps formed between the extraction and dosage elements and both the outlet of the hopper and the lamination cylinders, thereby to eliminate the formation of any excess compression of the paste at the gaps.

Advantageously, the extrusion apparatus further comprises a delimiting unit that is suitable for uniformly delimiting the edges of the paste to reinforce them and to prevent possible breakages, caused by elongation, at the edges of the sheet of paste.

Furthermore, downstream of the belt conveyor it is possible to provide a peripheral unit that comprises a pair of lamination cylinders, a smooth lower one and an upper one with free beating peripheral rollers, which are meant to reduce the thickness of the band or sheet of paste, already pre-formed by the rollers, that has formed below the hopper.

BRIEF DESCRIPTION OF THE DRAWINGS

The technical aspects and advantages of the present invention will become apparent from the following detailed description of some embodiments, given only by way of non-limitative example with reference to the accompanying drawings, wherein.

DESCRIPTION OF THE PREFERRED EMBODIMENTS

In the various Figures, identical or similar parts or components have been designated by the same reference numerals.

Initially with reference to FIGS. 1 to 8, the reference numeral 1 generally designates an apparatus according to the invention, which is formed by a supporting framework which is substantially C-shaped and comprises a base 2 for resting on the ground by means of feet 3 or wheels 4 and a box-like post 5 with a supporting plate or side panel 6. The side panel 6 supports, in a cantilevered manner above the base 2, a feed hopper 7 in which a mass of paste 8 to be extruded is placed, and also supports, from the top downwards, a pair of extraction and dosage elements 9 which are arranged at the bottom of the hopper 7 to support and "bite" into the paste 8 and extract it in a controlled manner from said hopper, as further described hereinafter, to a sequence or set of three pairs of contrarotating sizing or lamination cylinders 10, 11 and 12.

Figure 1:
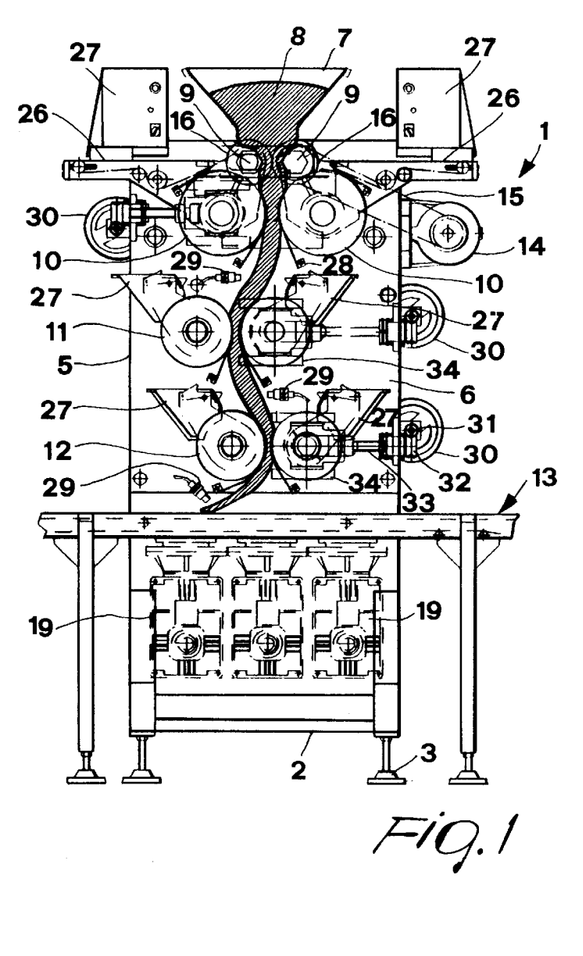
FIG. 1 is a lateral elevation sectional view of a first embodiment of an extrusion apparatus according to the invention.
Figure 2:
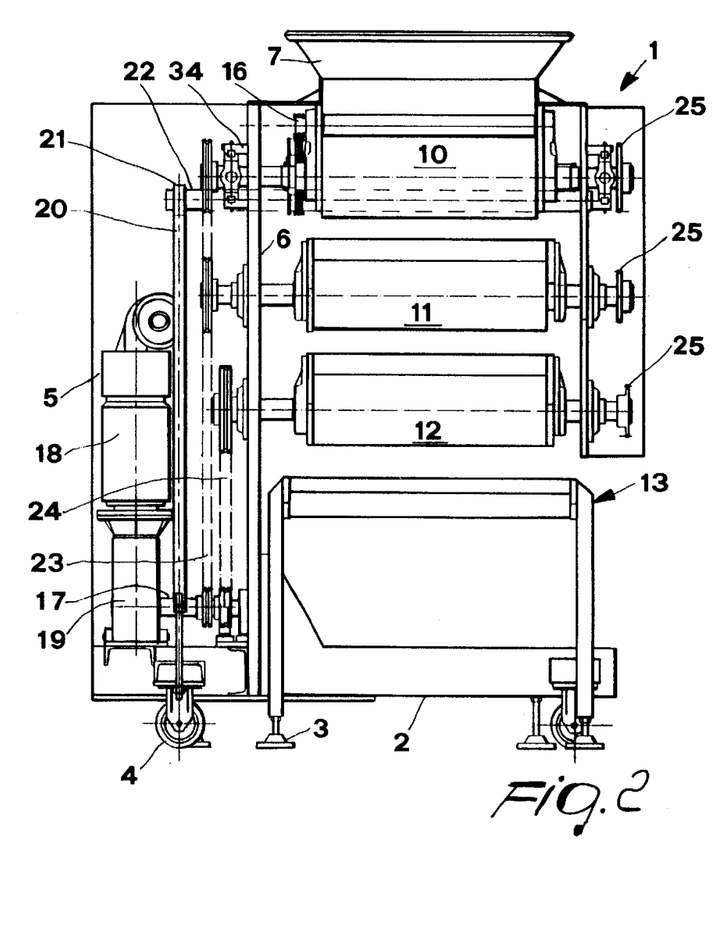
FIG. 2 is a sectional view taken between the various roller pairs of the apparatus of FIG. 1.

In the space between the lower pair 12 of sizing cylinders and the base 2 it is possible to removably insert a belt conveyor 13 which is meant to collect and remove the paste that is extruded and laminated by the sizing cylinders 10, 11 and 12.

Figure 3:
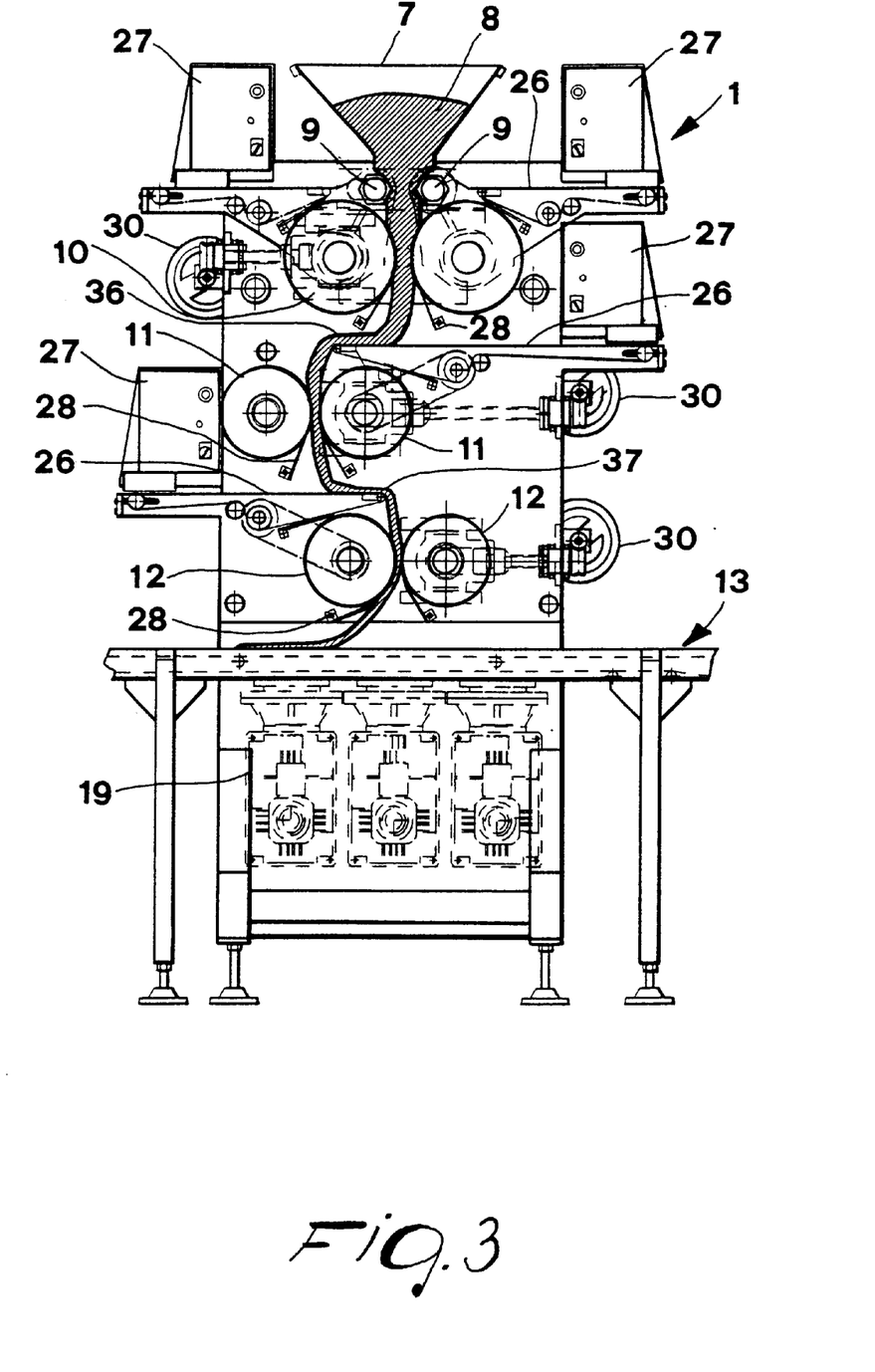
FIG. 3 is a view that is similar to FIG. 1 but relates to another embodiment.
Figure 4:
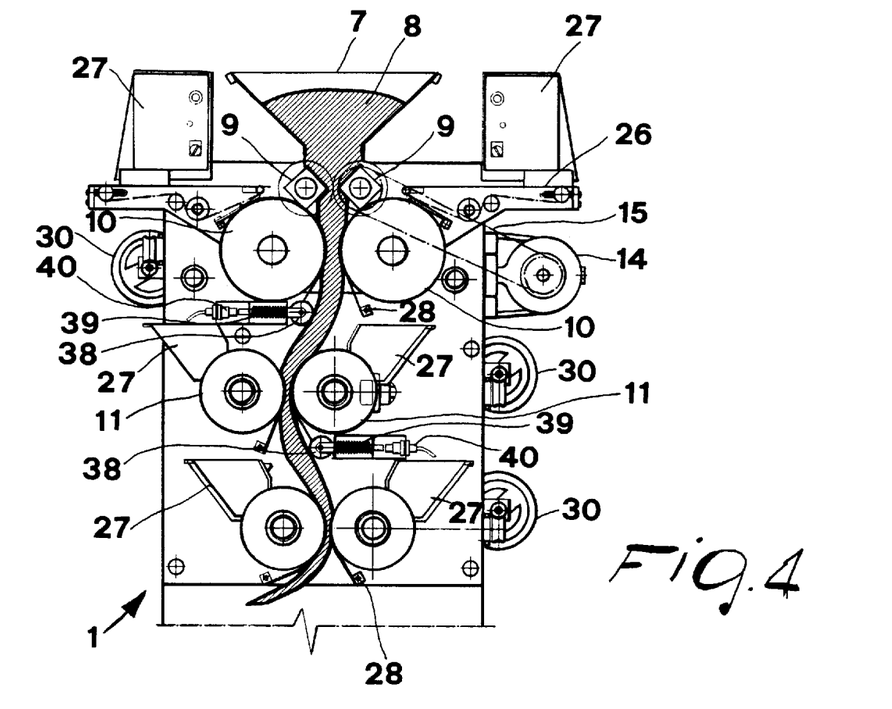
FIG. 4 is an enlarged-scale partial sectional view of FIG. 1, with some variations.
Figure 5:
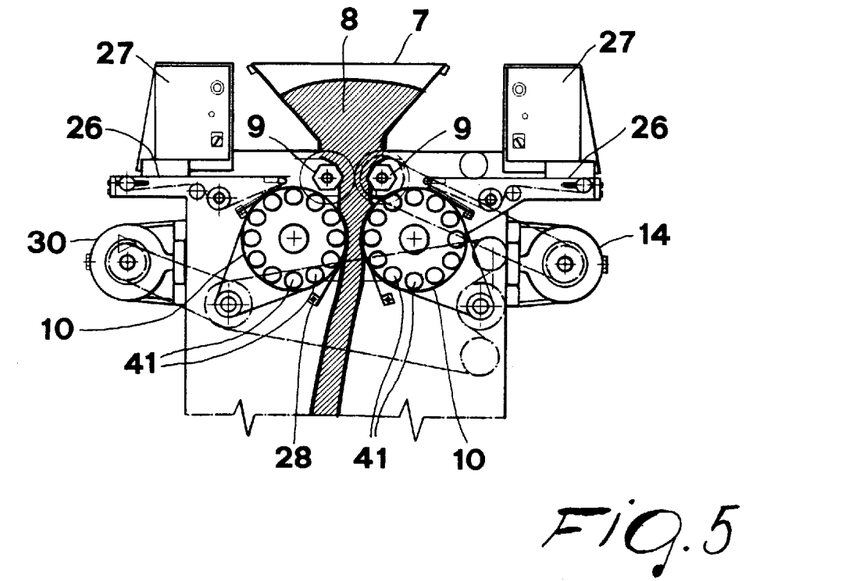
FIGS. 5 to 8 are sectional views of an equal number of embodiments of extraction and dosage elements which are arranged below the feed hopper and cooperate therewith.
Figure 6:
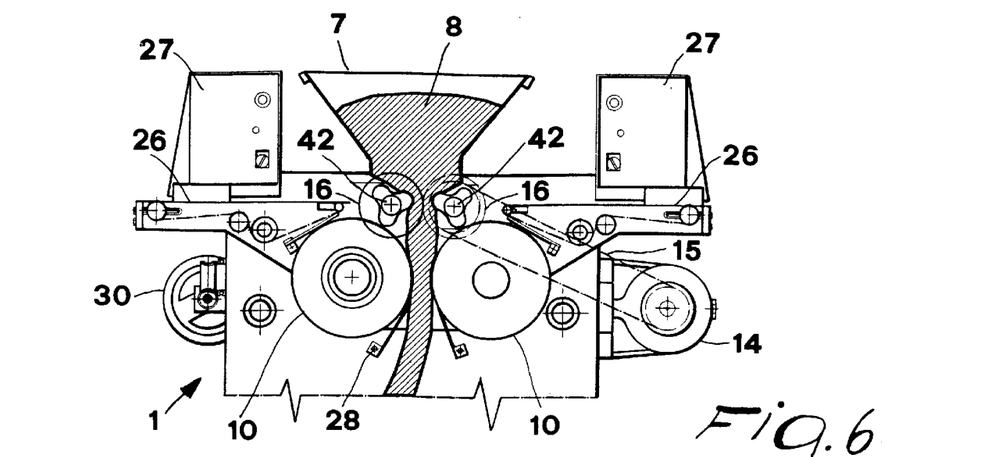

The pair of extraction and dosage elements 9 can be shaped like contrarotating "rollers" which are symmetrical with respect to the centerline but have a polygonal profile, for example a hexagonal cross-section as in FIGS. 1, 3 and 5, or a square cross-section as in FIG. 4, or with a lobate triangular cross-section as in FIG. 6. One of the elements draws its motion from a gearmotor-variator unit 14 which transmits the motion to one of said elements by means of a chain 15; said element transmits it to the other element by means of two end gears 16.

Since the extraction and dosage rollers 9 have a non-circular profile, they apply a pulsed or intermittent biting action on the overlying mass of paste, which is drawn gradually without stretching or discontinuities with a sequential action that produces small taperings and expansions that ensure metered and uniform feeding to the underlying set of sizing cylinders 10, 11 and 12.

The extraction and dosage rollers 9 have large and small diameters for forming the non-circular profiles, and the rollers 9 are arranged in rotation such that the large and small diameters are arranged in the same plane extending between the respective rotation axes of the rollers 9.

As it can be seen in FIGS. 1–8, the upper sizing cylinders 10 are arranged with respect to the extraction and dosage rollers 9 in the apparatus such that the paste 8 is fed in a sheet form from the extraction and dosage rollers 9 outside of the hopper 7 directly, i.e. without making contact with any other element of the apparatus, to the upper sizing cylinders 10. Thereafter, the pairs of sizing cylinders 10, 11 and 12 delimit a convoluted descent path for the paste being laminated or sized, so as to prevent it from being excessively stretched either due to its own weight or by the traction of a pair of lower cylinders.

From FIG. 1 in particular it is seen that the citation and dosage rollers 9 have eternal diameters which are smaller than the external diameters of each one of the upper pur of sizig cylinders 10.

The extraction and dosage rollers 9 are arranged in a spaced relationship from both the outlet of the hopper 7 and the upper pair 10 of sizing cylinders, so that the paste is exposed to the external environment at the gaps formed between the extraction and dosage rollers and both the outlet of the hopper 7 and the upper pair 10 of sizing cylinders, thereby to eliminate the formation of any excess compression of the paste at the gaps.

Moreover, the inside of the hopper 7 is completely empty such that only the extraction and dosage rollers 9 arranged outside of the hopper 7 extract the paste from the hopper and feed the paste to the upper pair 10 of sizing cylinders, which further eliminates the formation of any excess compression of the paste in the hopper 7.

The upper sizing cylinders 10 draw the motion of the output shaft 17 of a respective assembly composed of a motor 18 and of a reduction unit 19 located in the box-like post 5, by means of a chain 20 that actuates a sprocket 21 which is keyed on the hub 22 of one of the cylinders 10, whereas the other cylinder draws its motion from the first one, for example with a belt transmission. In a similar manner, the cylinders 11 and 12 also draw their motion by means of respective chains 23 and 24 from the output shaft 17 of the other gearmotor-variator units.

On the opposite side with respect to the transmission chains 20, 23 and 24, the cylinders 10, 11 and 12 have a respective sprocket 25 for the actuation, by means of a chain, of appropriate flour-spreading belts 26 having outlets arranged for spreading flour on the first pair of lamination cylinders 10 arranged directly below the pair of extraction and dosage elements 9. As seen in particular in FIG. 1, the outlets of the belts 26 are arranged such that flour is fed from above onto the pair of lamination cylinders 10 in a space arranged substantially directly between the cylinders 10 and the extraction and dosage elements 9. The belts 26 are supplied by respective flour distribution devices (not shown in the drawings) provided with a hopper 27. Advantageously, the pair of lamination cylinders 10 may be provided with mutually parallel channels preferably of about 0.5 cm depth extending in the surface of the cylinders 10 for retaining flour in the channels for securing that flour is present on the cylinders 10 when they contact the paste extracted by the extraction and dosage elements 9.

Respective scraper blades 28 and flour removing devices 27 are arranged below each pair of cylinders 10, 11 and 12.

The actuation of the extraction and dosage rollers 9 is advantageously independent of the actuation of the sizing cylinders, in which case their peripheral speed is matched with the type of paste that is used and with the mutual distance between the rollers; however, this actuation can also be drawn from the actuation of the upper cylinders 10.

Along the convoluted path that the paste being laminated is forced to follow there are means for detecting the tension of the paste, arranged for example at the inlet of the pair of cylinders 11 and 12, in order to adjust, if necessary, the rotation rate of the lamination cylinders to avoid stretching or compressing, beyond certain empirically determinable limits, the paste being laminated. Said detection means are preferably constituted by conventional photocells 29, one of which can also be provided directly upstream of the conveyor 13, capable of detecting, in a known manner, the tension or the stretched or compressed state of the paste which is laminated by the cylinders by detecting the thickness of the laminated paste, so that the rotation rate of the lamination cylinders may be adjusted in order to achieve the particular desired stretched or compressed state of the laminated paste.

The mutual distance between the pairs of cylinders 10, 11 and 12 can be adjusted by means of a respective handwheel 30, which moves the lateral supports of one of the cylinders along respective guides 34 by means of a main shaft 31, a worm screw 32 and a secondary shaft 33.

It is also possible to provide only two pairs of sizing cylinders.

In FIG. 3, the paste that leaves the upper sizing cylinders rests for a certain horizontal extent 36 and 37 on the underlying forming belt 26 before going between the cylinders 11 and 12.

FIG. 4 illustrates means for detecting the tension of the paste which are constituted by rollers 38 loaded by a respective spring 39 which is associated with a respective transducer 40 that sends electric control signals to an electronic control unit (not shown in the drawings).

The embodiment of FIG. 5 comprises a pair of upper cylinders 10 which is formed by two drums provided with a plurality of freely rotating peripheral cylinders 41 which, by making contact with the paste, partially rotate about their own axis without applying unwanted tensions to the paste.

Instead of the hexagonal extraction and dosage rollers, FIG. 6 shows a pair of extraction and dosage elements 42 with three lobes which are arranged in a mirror-symmetrical manner with respect to the centerline.

Figure 7:
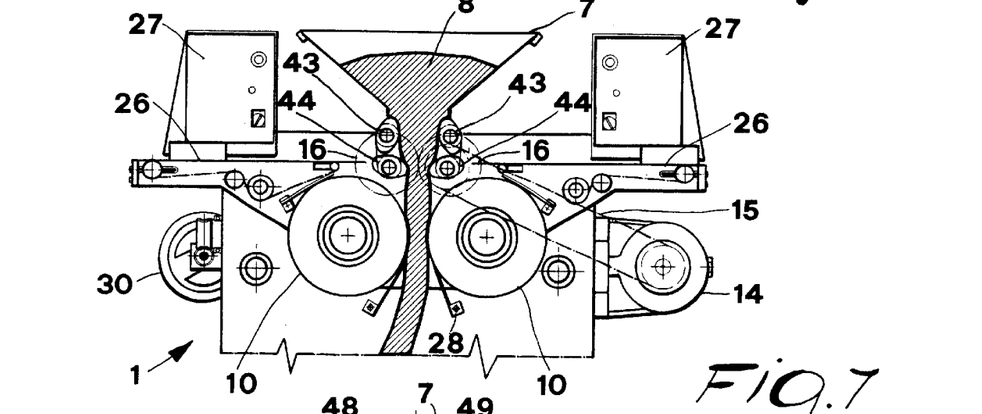

In FIG. 7, the extraction and dosage elements are constituted by two pairs of elements with two lobes or with an oval cross-section 43 and 44 which are mutually offset by 90° and which, during use, produce a biting action that forms a sequence of tapered and widened portions on the paste.

Figure 8:
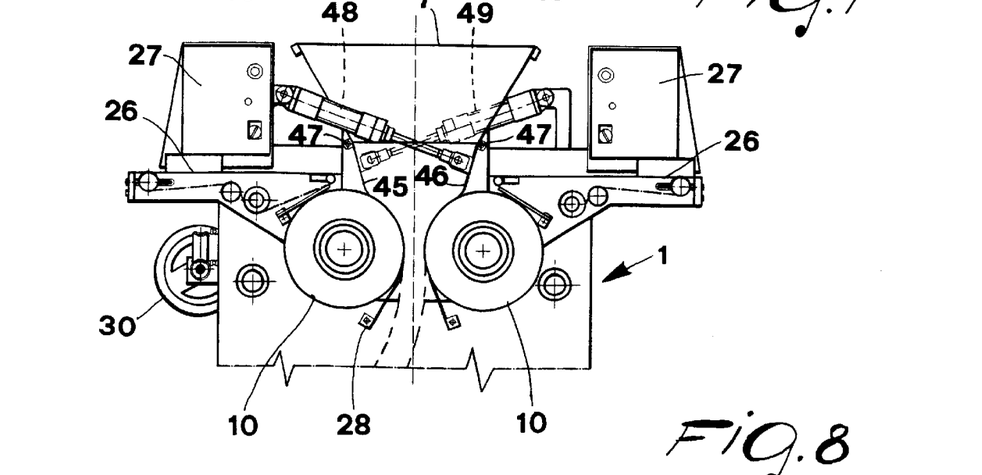
Figure 9:
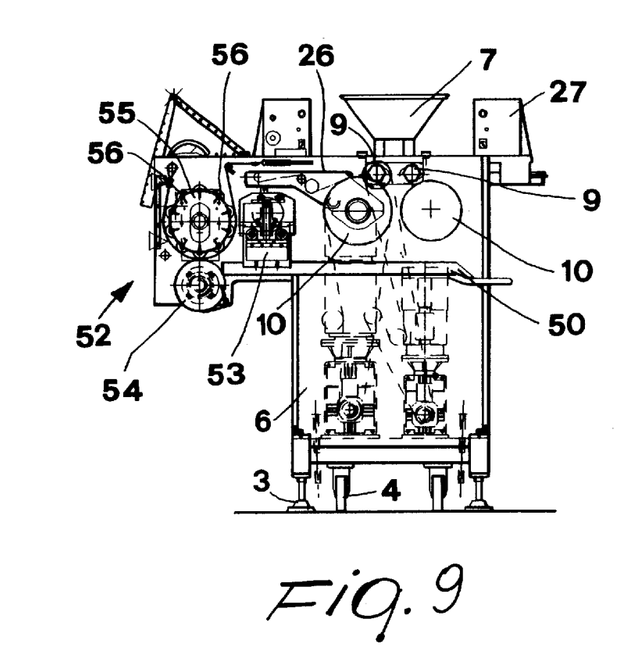
FIG. 9 is a schematic lateral elevation view, with some parts show in cross-section, of an extrusion apparatus with a peripheral unit according to another preferred aspect of the invention.
Figure 10:
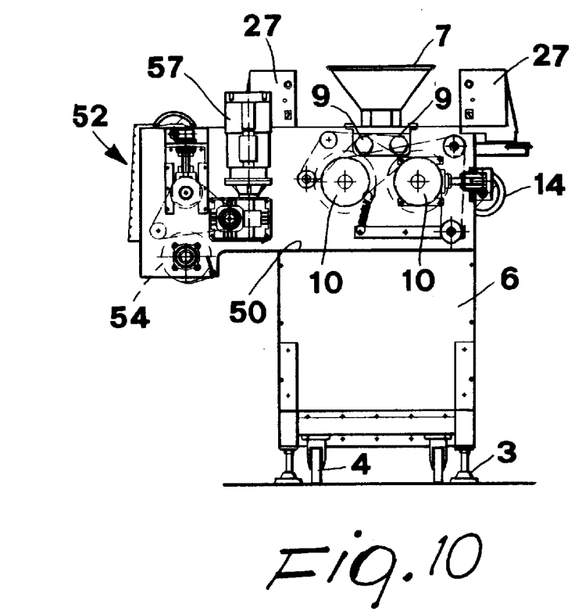
FIG. 10 is a view that is similar to FIG. 9 but is taken along a different vertical sectional plane.
Figure 11:
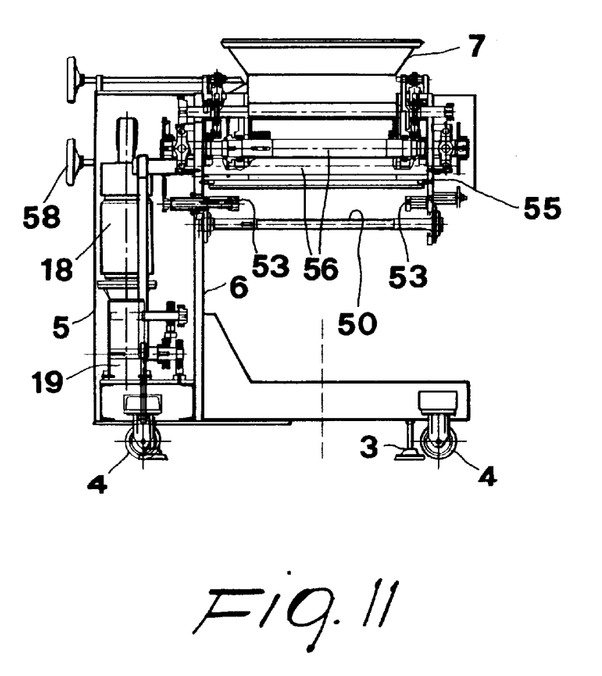
FIG. 11 is a side view, with parts shown in cross-section, of the apparatus of FIG. 9.
Figure 12:
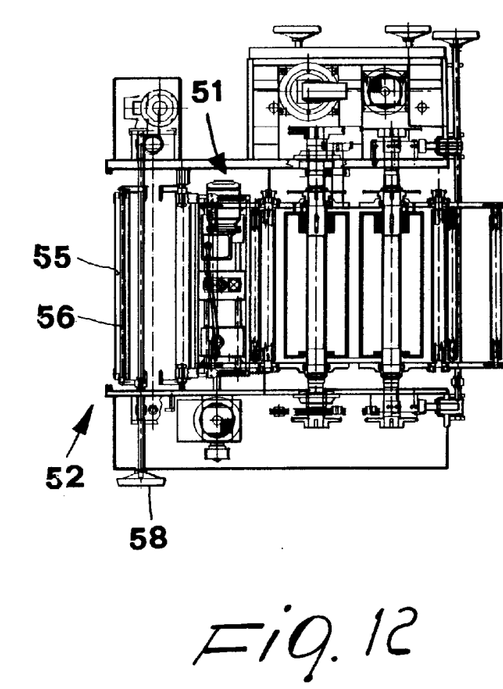
FIG. 12 is a plan view, with parts removed, of the extrusion apparatus of FIG. 10.
Figure 13:
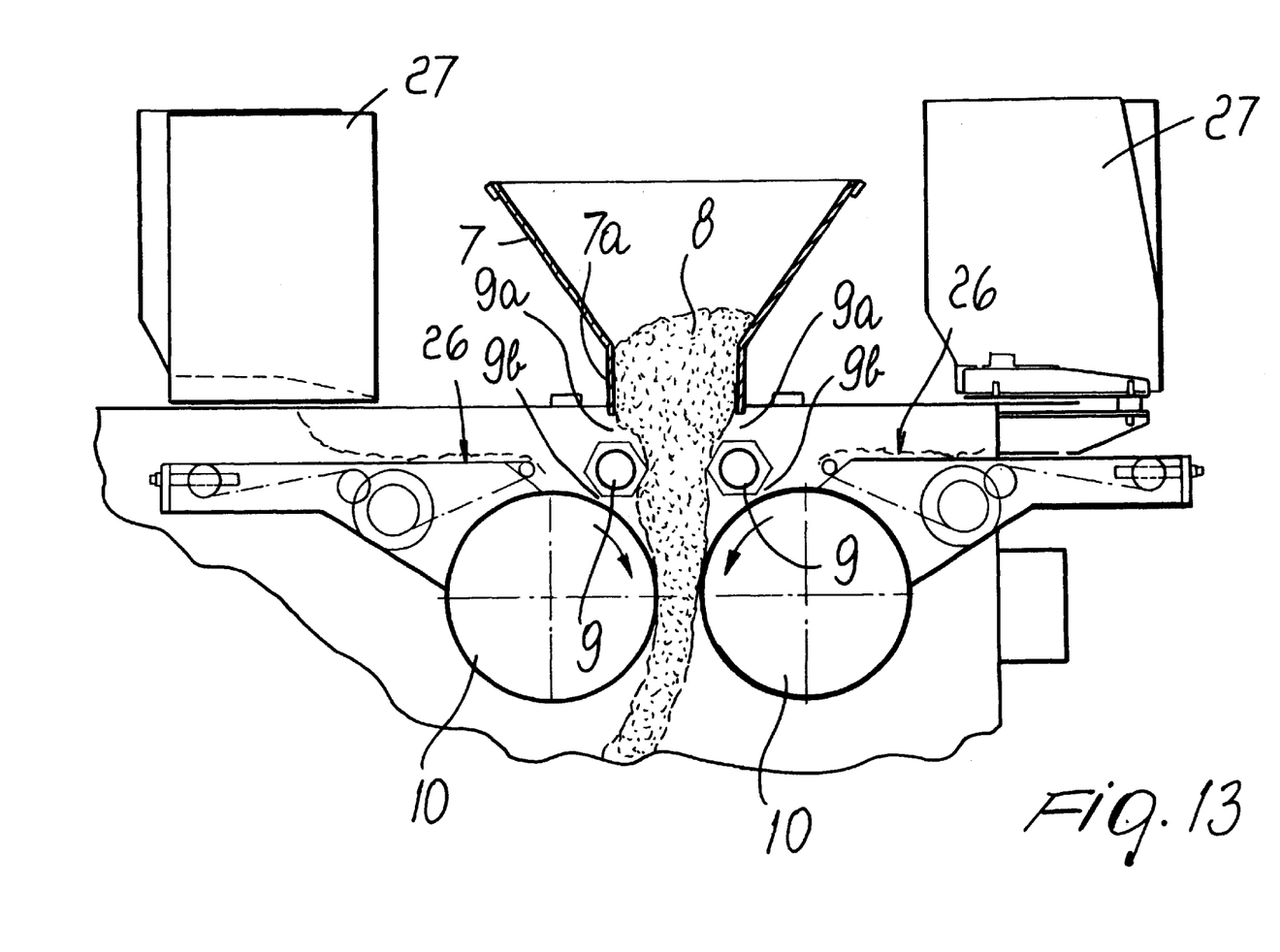
FIG. 13 is a schematic partially sectional detail view of the apparatus of FIGS. 9–12.

The embodiment of FIG. 8 has two oppositely arranged walls 45 and 46 which are pivoted along axes 47 which are parallel to the rotation axes of the upper sizing cylinders 10.

Each wall 45 and 46 is articulated to a respective linear actuator, such as a hydraulic or pneumatic jack 48 and 49, which is driven by the electronic control unit so as to make the walls 45 and 46 oscillate rhythmically about the respective pivoting axis 47 and subject the paste to a sequence of controlled compressions and widening actions.

With reference to FIGS. 9 to 13, there is illustrated an extrusion apparatus in which the paste, at the outlet of the sizing cylinders 10, is placed on a horizontal belt conveyor or auxiliary belt 50 which feeds it, by passing through a delimiting unit 51, to a peripheral unit 52. Also in this embodiment, the sizing cylinders 10 are arranged with respect to the extraction and dosage rollers 9 such that the paste is exposed to the external environment at the gaps 9a and 9b formed between the extraction and dosage rollers 9 and both the outlet; 7a of the hopper 7 and the pair of sizing cylinders 10, thereby to eliminate the formation of any excess compression of the paste at the gaps 9a and 9b.

Also in this embodiment, the inside of the hopper 7 is completely empty such that only the extraction and dosage rollers 9 arranged outside of the hopper 7 extract the paste from the hopper and feed the paste to pair of sizing cylinders 10, which further eliminates the formation of any excess compression of the paste in the hopper 7.

Moreover in this embodiment, the elements for forming the sheet of paste in the initial portion of the apparatus arranged upstream of the delimiting unit 51 and peripheral unit 52 are constituted by only one single pair of extraction and dosage rollers 9 and only one single pair of sizing cylinders 10, such that the paste is fed directly from the single pair of sizing cylinders 10 to the horizontal belt 50 which in turn directly feeds the paste in sheet form to the delimiting unit 51.

The delimiting unit 51 can be constituted by two sides 53 that can be optionally actuated with a reciprocating motion at right angles to the advancement direction of the paste on the conveyor 50, and this arrangement uniformly delimits the edges of the band or sheet of paste. It also allows to adjust the width of the band of paste that must be set, together with the extent of the back-and-forth motion, in each instance for each type of paste.

The peripheral unit 52 is formed by a lower supporting cylinder 54 which is rotated by its own motor unit (not shown in the drawings) and by a roller 55 with peripheral rollers 56 that is actuated by a gearmotor 57. The roller 55 laminates the paste by beating it on the cylinder 54 with its own peripheral rollers 56, thus reducing its thickness. By virtue of the presence of a handwheel 58 it is possible to vary the output thickness of the paste that leaves the cylinders 54 and 55 even while the machine is moving. While the machine is moving it is also possible to adjust the mutual distances of the rollers 9 and of the cylinders 10.

Advantageously, the conveyor 50 is pivoted proximate to the peripheral unit 52 so as to allow access to the sizing cylinders 10 for the necessary cleaning and maintenance actions. For this purpose it is also possible to rapidly manually release the transmission of the conveyor 50.

It is evident that an apparatus for extruding edible paste described above is extremely versatile and can be adapted to the characteristics and requirements of leavened and non-leavened pastes. In practice, said apparatus allows to obtain a product of excellent quality both from the "aesthetical" point of view and from the point of view of taste without the aid of particular enhancers or hard-wheat flours with a high protein percentage. This entails a considerable economic advantage in the purchase of raw materials and energy saving due to simplification of the production process.

The economic advantage that consists in being able to use normal flours on a forming belt instead of hard-wheat flours can be estimated at 25% (which is equal to the average difference between the costs of the two flour types).

The particular arrangement according to the provision of the respective gaps formed between the extraction and dosage rollers 9 and both the outlet of the hopper 7 and the pair of sizing cylinders 10 is particularly advantageous for a method of forming a band of leavened dough since the leavened dough is exposed to the external environment at the gaps which eliminates the formation of any excess compression of the leavened dough thereby to avoid the breakage of leavened gas bubbles in the leavened dough. In this manner, the final product is more similar to a hand-worked leavened dough sheet. The provision according to which the hopper 7 is completely empty such that only the extraction and dosage rollers 9 arranged outside of the hopper 7 extract the paste from the hopper and feed the paste to pair of sizing cylinders 10 further adds to avoiding the breakage gas bubbles formed inside the leavened dough thereby to provide a superior end product. In the prior devices which include rotating cylinders having radially protruding blades, the arrangement in these devices is such as to create closed compression chambers between the cylinders and the subsequent shaping device which may lead to the excessive damaging of the dough and in particular to the breakage of the gas bubbles formed inside leavened dough.

The above described invention is naturally susceptible to numerous modifications and variations within the protective scope defined by the content of the claims that follow.

The materials and the dimensions may be various and according to the requirements.

What is claimed is:

1. An apparatus for forming edible bakery paste comprising:

a hopper for feeding paste to be formed, said hopper having a lower outlet through which paste from said hopper is adapted for being extracted;

at least one pair of driven cylindrical lamination cylinders arranged in sequence downstream of the hopper;

at least one pair of driven extraction and dosage elements which are arranged outside of said hopper and directly below the outlet of said hopper and above said at least one pair of lamination cylinders, each one of said at least one pair of extraction and dosage elements having a non-circular profile and an external diameter smaller than the external diameter of each one of an upper pair of said at least one pair lamination cylinders such that said at least one pair of extraction and dosage elements is suitable for applying an intenmittent biting action onto an outer surface of said paste for feeding said paste from the outlet of said hopper to said at least one pair of lamination cylinders;

said at least one pair of extraction and dosage elements being arranged in a spaced relationship from said outlet of said hopper such that first gaps are formed between said outlet of said hopper and said at least one pair of extraction and dosage elements for exposing the paste disposed between said outlet of said hopper and said at least one pair of extraction and dosage elements to the external environment for eliminating the formation of any excess compression of the paste at said first gaps; and said at least one pair of extraction and dosage elements being arranged in a spaced relationship from said upper pair of said at least one pair of lamination cylinders such that second gaps are formed between said upper pair of said at least one pair of lamination cylinders and said at least one pair of extraction and dosage elements for exposing the paste disposed between said upper pair of said at least one pair of lamination cylinders and said at least one pair of extraction and dosage elements to the external environment for eliminating the formation of any excess compression of the paste at said second gaps.

2. The apparatus of claim 1 further comprising a flour-spreading unit arranged for spreading flour on said upper pair of said at least one pair of lamination cylinders and arranged directly below said pair of extraction and dosage elements such that flour is fed from above onto said upper pair of said at least one pair of lamination cylinders substantially at said second gaps.

3. The apparatus of claim 2 wherein said flour-spreading unit comprises a flour conveyor belt having an outlet arranged directly above said upper pair of said at least one pair of lamination cylinders arranged directly below said pair of extraction and dosage elements, and an auxiliary hopper for the feeding of flour to said flour conveyor belt.

4. The apparatus of claim 2 wherein said upper pair of said at least one pair of lamination cylinders is provided with mutually parallel channels extending in the surface of said upper pair of said at least one pair of lamination cylinders for retaining flour in the channels for securing that flour is present on said upper pair of said at least one pair of lamination cylinders when said upper pair of said at least one pair of lamination cylinders contact the paste extracted by said extracting and dosage elements.

5. The apparatus of claim 1 further comprising a belt conveyor arranged below said at least one pair of lamination cylinders for receiving and removing the laminated paste that leaves said at least one pair of lamination cylinders.

6. The apparatus of claim 1 wherein the inside of said hopper is completely empty such that only said extraction and dosage elements arranged outside of said hopper extract the paste from said hopper and feed the paste to said lamination cylinders.

7. The apparatus of claim 1 wherein said pair of extraction and dosage elements have large and small diameters for forming the non-circular profiles of said pair of extraction and dosage elements, said pair of extraction and dosage elements being arranged in rotation such that the large and small diameters are arranged in the same plane extending between the respective rotation axes of said pair of extraction and dosage elements.

8. An apparatus for forming edible bakery paste comprising:

a hopper for feeding paste to be formed, said hopper having a lower outlet through which paste from said hopper is adapted for being extracted;

a single pair of driven cylindrical lamination cylinders arranged downstream of the hopper;

a single pair of driven extraction and dosage elements which are arranged outside of said hopper and directly below the outlet of said hopper and above said single pair of lamination cylinders, each on of said pair of extraction and dosage elements having a non-circular profile and an external diameter smaller than the external diameter of each one of said pair of lamination cylinders such that said side pair of extraction and dosage elements is suitable for applying an intermittent biting action onto an outer surface of said paste for feeding said paste from the outlet of said hopper to said pair of lamination cylinders;

said pair of extraction and dosage elements being arranged in a spaced relationship from said outlet of said hopper such that first gaps are formed between said outlet of said hopper and said pair of extraction and dosage elements for exposing the paste disposed between said outlet of said hopper and said pair of extraction and dosage elements to the external environment for eliminating the formation of any excess compression of the paste at said first gaps; and said pair of extraction and dosage elements being arranged in a spaced relationship from said pair of lamination cylinders such that second gaps are formed between said pair of lamination cylinders and said pair of extraction and dosage elements for exposing the paste disposed between said pair of lamination cylinders and said pair of extraction and dosage elements to the external environment for eliminating the formation of any excess compression of the paste at said second gaps.

9. The apparatus of claim 8 further comprising a flour-spreading unit arranged for spreading flour on said pair of lamination cylinders and arranged directly below said pair of extraction and dosage elements such that flour is fed from above onto said pair of lamination cylinders substantially at said second gaps.

10. The apparatus of claim 9 wherein said flour-spreading unit comprises a flour conveyor belt having an outlet arranged directly above said pair of lamination cylinders arranged directly below said pair of extraction and dosage elements, and an auxiliary hopper for the feeding of flour to said flour conveyor belt.

11. The apparatus of claim 9 wherein said pair of lamination cylinders is provided with mutually parallel channels extending in the surface of said pair of lamination cylinders for retaining flour in the channels for securing that flour is present on said pair of lamination cylinders when said pair of lamination cylinders contact the paste extracted by said extraction and dosage elements.

12. The apparatus of claim 8 further comprising a belt conveyor arranged below said single pair of lamination cylinders for receiving and removing a band of laminated paste that leaves said single pair of lamination cylinders.

13. The apparatus of claim 12 further comprising a delimiting unit arranged to receive the band of laminated paste on said belt conveyor and for acting at edges of the band of laminated paste for eliminating any cracks formed at the edges of the band of laminated paste, and a peripheral unit for further reducing a thickness of the band of laminated paste, said peripheral unit being fed by said delimiting unit.

14. The apparatus of claim 13 wherein said delimiting unit comprises two sides suitable for uniformly delimiting the edges of the band of the extruded paste, said two sides being actuatable with a reciprocating motion at right angles to the a ement direction of the band of laminated paste on said conveyor.

15. The apparatus of claim 13 wherein said peripheral unit comprises a lower rotatable supporting cylinder and an upper rotatable roller provided with a plurality of peripheral rollers.

16. The apparatus of claim 8 wherein the inside of said hopper is completely empty such that only said extraction and dosage elements arranged outside of said hopper extract the paste from said hopper and feed the paste to said lamination cylinders.

17. The apparatus of claim 8 wherein said pair of extraction and dosage elements have large and small diameters for forming the non-circular profiles of said pair of extraction and dosage elements, said pair of extraction and dosage elements being arranged in rotation such that the large and small diameters are arranged in the same plane extending between the respective rotation axes of said pair of extraction and dosage elements.

18. The apparatus of claim 8 further comprising:
   a flour-spreading unit arranged for spreading flour on said pair of lamination cylinders and arranged directly below said pair of extraction and dosage elements such that flour is fed from above onto said pair of lamination cylinders substantially at said second gaps;
   a belt conveyor arranged below said pair of lamination cylinders for receiving and removing a band of laminated paste that leaves said pair lamination cylinders;
   a delimiting unit arranged to receive the band of laminated paste on said belt conveyor and for acting at edges of the band of laminated paste for eliminating any cracks formed at the edges of the band of laminated paste; and
   a peripheral unit for further reducing a thickness of the band of laminated paste, said peripheral unit being fed by said delimiting unit.

* * * * *